United States Patent
McManus

(10) Patent No.: US 10,183,719 B2
(45) Date of Patent: Jan. 22, 2019

(54) PASSENGER TRAILER APPARATUS

(71) Applicant: David McManus, Canyon City, CA (US)

(72) Inventor: David McManus, Canyon City, CA (US)

( * ) Notice: Subject to any disclaimer, the term of this patent is extended or adjusted under 35 U.S.C. 154(b) by 0 days.

(21) Appl. No.: 15/471,948

(22) Filed: Mar. 28, 2017

(65) Prior Publication Data

US 2017/0341698 A1 Nov. 30, 2017

Related U.S. Application Data

(60) Provisional application No. 62/314,090, filed on Mar. 28, 2016.

(51) Int. Cl.
| | |
|---|---|
| *B62K 5/007* | (2013.01) |
| *B60D 1/06* | (2006.01) |
| *B62K 27/00* | (2006.01) |
| *B62D 63/08* | (2006.01) |
| *B62K 27/12* | (2006.01) |
| *B60D 1/00* | (2006.01) |
| *B62D 63/06* | (2006.01) |

(52) U.S. Cl.
CPC .............. *B62K 5/007* (2013.01); *B60D 1/065* (2013.01); *B62D 63/08* (2013.01); *B62K 27/003* (2013.01); *B62K 27/12* (2013.01); *B60D 2001/005* (2013.01); *B62D 63/064* (2013.01)

(58) Field of Classification Search
CPC ...... B62K 5/007; B62K 27/003; B60D 1/065; B60D 2001/005; B62D 63/08
See application file for complete search history.

(56) References Cited

U.S. PATENT DOCUMENTS

| | | | | |
|---|---|---|---|---|
| 4,077,645 | A * | 3/1978 | Dortch ................. | B62K 27/003 280/124.17 |
| 4,695,071 | A * | 9/1987 | Johnston ................ | A61G 5/023 280/204 |
| 5,064,209 | A * | 11/1991 | Kurschat ................ | B62K 5/025 280/204 |
| 5,261,683 | A * | 11/1993 | Kurdziel ................ | B62K 27/02 280/204 |
| 5,269,548 | A * | 12/1993 | Milligan ............... | A61H 1/0214 280/204 |

(Continued)

*Primary Examiner* — Erez Gurari
(74) *Attorney, Agent, or Firm* — Ruth Eure

(57) ABSTRACT

A passenger trailer apparatus for towing a passenger behind a mobility scooter is provided. The mobility scooter has a tow bar or hitch. The passenger trailer apparatus comprises a trailer frame and an axle mounted to and through the trailer frame. A tire is rotatably, releasably mounted to each end of the axle. The platform has a top surface and a bottom surface with the bottom surface of the platform mounted to the trailer frame. A chair assembly is mounted to the top surface of the platform with the chair assembly sized and shaped for receiving a passenger. A receiver bar having a first end and a second end is provided. The first end of the receiver bar is connected to the platform and the second end of the receiver bar capable of being releasably connected to the tow bar or hitch of the mobility scooter. The passenger trailer apparatus provides secure, reliable performance, quick assembly and breakdown, and easy transport and storage.

17 Claims, 2 Drawing Sheets

(56) References Cited

U.S. PATENT DOCUMENTS

| | | | | |
|---|---|---|---|---|
| 5,513,868 A | * | 5/1996 | Barr | B62D 63/062 |
| | | | | 280/400 |
| 6,325,168 B1 | * | 12/2001 | Hillel | A61G 5/104 |
| | | | | 180/14.1 |
| 6,422,641 B1 | * | 7/2002 | Coryell | B62D 33/0621 |
| | | | | 224/274 |
| 6,557,882 B2 | * | 5/2003 | Harrington | B60D 1/143 |
| | | | | 280/415.1 |
| 6,808,231 B1 | * | 10/2004 | Hill | B60R 9/06 |
| | | | | 296/26.09 |
| 6,883,819 B2 | * | 4/2005 | Byrd | A61G 5/00 |
| | | | | 280/250.1 |
| 6,893,028 B2 | * | 5/2005 | Smith | A61G 5/10 |
| | | | | 280/204 |
| 7,025,363 B1 | * | 4/2006 | Leight | B62B 1/10 |
| | | | | 280/47.131 |
| 7,093,841 B2 | * | 8/2006 | Conrad | B60B 33/0039 |
| | | | | 280/33.991 |
| 7,597,332 B2 | * | 10/2009 | Thompson | B62B 7/00 |
| | | | | 280/33.991 |
| 8,573,625 B2 | * | 11/2013 | Gramme | B62K 27/003 |
| | | | | 280/204 |
| 8,905,427 B2 | * | 12/2014 | Katz | B60B 33/0002 |
| | | | | 280/47.38 |
| 9,789,894 B2 | * | 10/2017 | Weber | B62B 9/28 |
| 2002/0096857 A1 | * | 7/2002 | Valdez | B62B 7/12 |
| | | | | 280/293 |

* cited by examiner

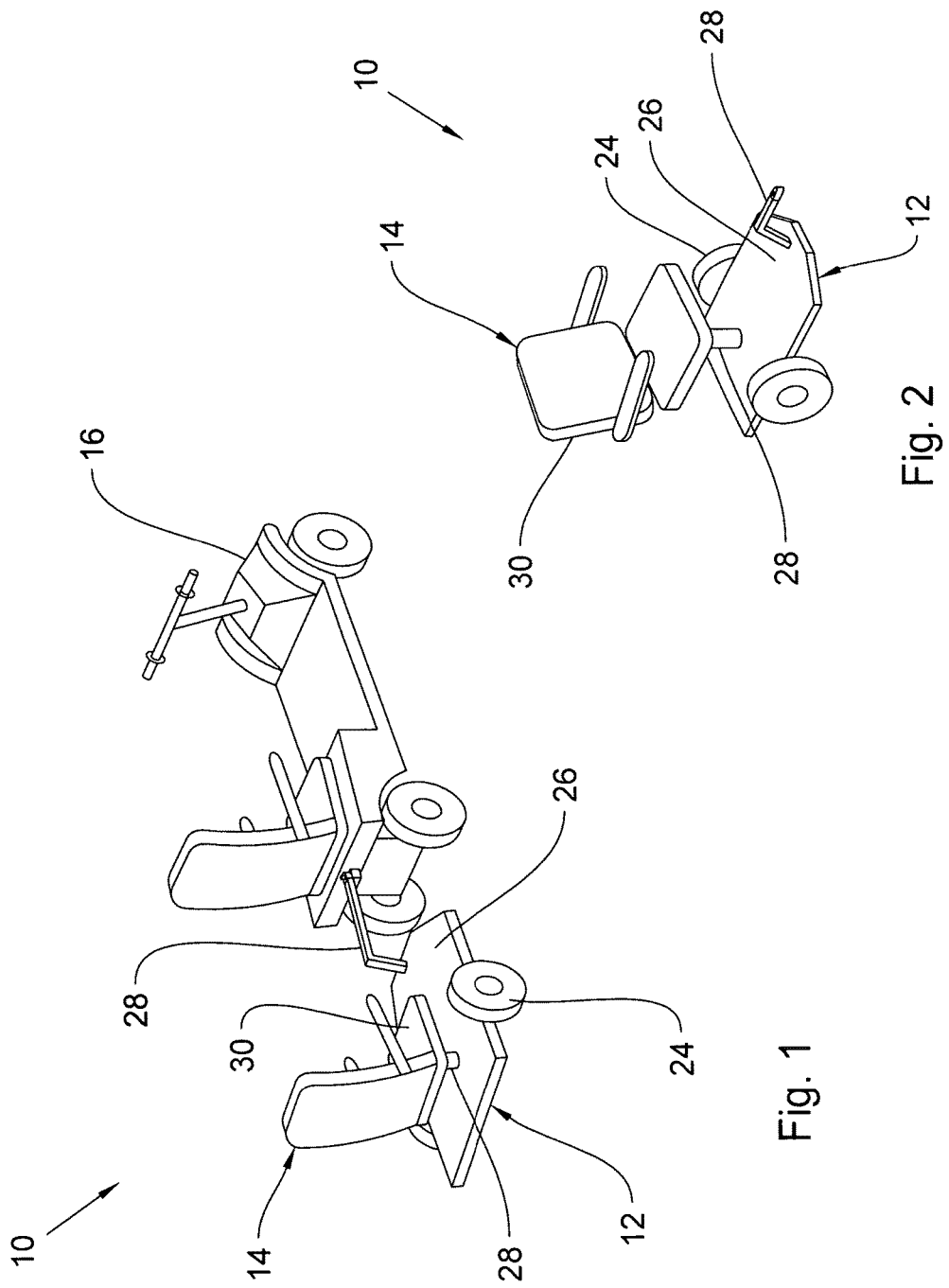

PASSENGER TRAILER APPARATUS

CLAIM OF PRIORITY

This patent application claims priority under 35 USC 119 (e) (1) from U.S. Provisional Patent Application Ser. No. 62/314,090 filed Mar. 28, 2016, of common inventorship herewith entitled, "Scooter Passenger Trailer," which is incorporated herein by reference as though the same were set forth in its entirety.

FIELD OF THE INVENTION

The present invention pertains to the field of passenger trailers devices, and more specifically to the field of passenger trailers attachable to mobility scooters providing a wheeled trailer equipped with a comfortable seat and constructed to be towed behind a mobility scooter.

BACKGROUND OF THE INVENTION

Mobility scooters have become extremely popular in recent years, with good reason. While persons who are unable to walk at all have no alternative to a conventional manual or electric wheelchair, persons of restricted mobility can move around very well with a scooter. These electric, battery powered vehicles are constructed more along the lines of a motor scooter. Mobility scooters have two rear wheels with a seat mounted over them, a flat floorboard for the feet, and a set of handlebars that turn one or two front wheels. The rider's feet rest on each side of the steering column. The seat generally swivels, giving the rider ease of mounting and dismounting.

Mobility scooters often are used by persons who can walk, but lack the strength, stamina or leg function to walk very long or far. An advantage of using a scooter is the scooter is generally lightweight and easily portable. Persons lacking great physical strength can easily disassemble a scooter in minutes and lift it into a car trunk. In contrast, power wheelchairs are heavy and generally require the use of a van and a special lift.

Scooters are maneuverable enough for use within apartment or home, portable enough to take to the store, sturdy enough to ride on the sidewalk. Some models can climb stairs or curbs and most models can be equipped with a cargo trailer. Mobility scooters do possess one distinct drawback in that there is no capacity at all for a passenger to ride on the scooter. Many couples in retirement communities or assisted living communities are left with no alternative but to possess two scooters.

The prior art has put forth several designs for transport trailers attachable to mobility devices. Among these are:

U.S. Pat. No. 8,573,625 to Ronald P. Gramme describes a riding platform device attachable to the back of a personal assistive mobility device, and more particularly to a removable and adjustable platform device for attachment to an electric or gas powered scooter that allows a companion to be transported along with the scooter and its driver, and thereby keep pace with an individual with limited mobility.

US Patent Publication 2013/0307234 to Judy Ann Anders describes a trailer and method for transporting a person adapted to be attached to a mobility scooter. The trailer includes a platform base supported on at least two wheels, at least one seat on the platform base, and a hitching assembly to attach the platform base to the motorized scooter.

US Patent Publication 2012/0248720 to Thomas Grato describes a utility transport wagon to be used with mobility scooters or other mobility device designed to carry cargo or children passengers, and a hitch system to adapt a mobility scooter or power chair to tow the wagon. The body is canopied and the floor is molded to form two seats at each end of the wagon. Located at each end of the wagon floor is a hinged backrest that folds flush with the floor when not in use. The canopy is supported by four collapsible or telescoping poles, these poles fitting into cylindrical openings at each top corner of the wagon's sides. The poles collapse into the openings when not in use. The front wheels of the wagon are mounted on each end of a pivoting, steering axle.

None of these prior art references describe the present invention.

SUMMARY OF THE INVENTION

It is an object of the present invention to provide a passenger trailer apparatus equipped with a comfortable seat and constructed to be towed behind a mobility scooter.

The present invention is a passenger trailer apparatus for towing a passenger behind a mobility scooter. The mobility scooter has a tow bar or hitch. The passenger trailer apparatus comprises a trailer frame and an axle mounted to and through the trailer frame. A tire is rotatably, releasably mounted to each end of the axle. The platform has a top surface, a bottom surface, a front edge, a rear edge, a first side edge, and a second side edge, the bottom surface of the platform mounted to the trailer frame. A chair assembly is mounted to the top surface of the platform with the chair assembly sized and shaped for receiving a passenger. A receiver bar having a first end and a second end is provided. The first end of the receiver bar is connected to the platform and the second end of the receiver bar capable of being releasably connected to the tow bar or hitch of the mobility scooter. The passenger trailer apparatus provides secure, reliable performance, quick assembly and breakdown, and easy transport and storage.

In addition, the present invention includes a method for towing a passenger behind a mobility scooter. The mobility scooter has a tow bar or hitch. The method comprises providing a trailer frame, mounting an axle mounted to and through the trailer frame, rotatably, releasably mounting a tire to each end of the axle, positioning a platform having a top surface and a bottom surface upon the trailer frame, mounting a chair assembly to the top surface of the platform, sizing and shaping the chair assembly for receiving a passenger, providing a receiver bar having a first end and a second end, connecting the first end of the receiver bar to the platform, connecting the second end of the receiver bar to the tow bar or hitch of the mobility scooter, and providing secure, reliable performance, quick assembly and breakdown, and easy transport and storage.

The present invention further includes a passenger trailer apparatus for towing a passenger behind a mobility scooter. The mobility scooter has a tow bar or hitch. The passenger trailer apparatus comprises a trailer frame having an outer extent and an axle mounted to and through the trailer frame. A tire is rotatably, releasably mounted to each end of the axle. A platform is provided having a top surface, a bottom surface, a front edge, a rear edge, a first side edge, and a second side edge. The bottom surface of the platform is mounted to the trailer frame with an outer extent of the platform extending completely beyond the outer extent of the trailer frame. A chair assembly is mounted to the top surface of the platform with the chair assembly sized and shaped for receiving a passenger. A receiver bar having a first end and a second end is provided with the first end of the receiver bar connected to the platform and the second end of the receiver bar capable of being releasably connected to the tow bar or hitch of the mobility scooter. The front edge of the platform preferably angles away from the first side edge and the second side edge forming a point. The passenger trailer apparatus provides secure, reliable performance, quick assembly and breakdown, and easy transport and storage.

BRIEF DESCRIPTION OF THE DRAWINGS

FIG. 1 is a rear perspective view illustrating a passenger trailer apparatus, constructed in accordance with the present invention, with the passenger trailer apparatus releasably secured to a mobility scooter.

FIG. 2 is a front perspective view illustrating the passenger trailer apparatus, constructed in accordance with the present invention, with the passenger trailer apparatus disconnected from the mobility scooter.

DETAILED DESCRIPTION OF THE INVENTION

Figure 4:
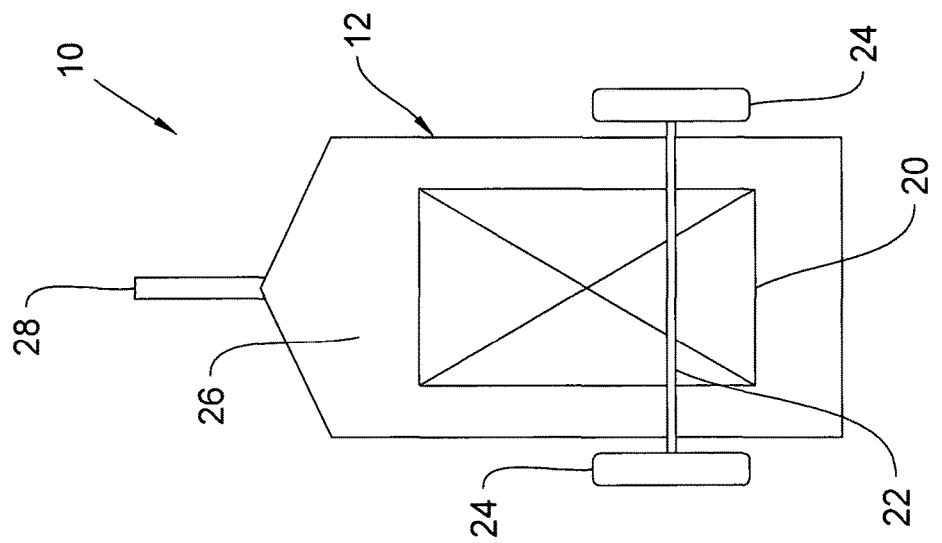
FIG. 4 is a bottom plan view illustrating the passenger trailer apparatus, constructed in accordance with the present invention.
Figure 3:
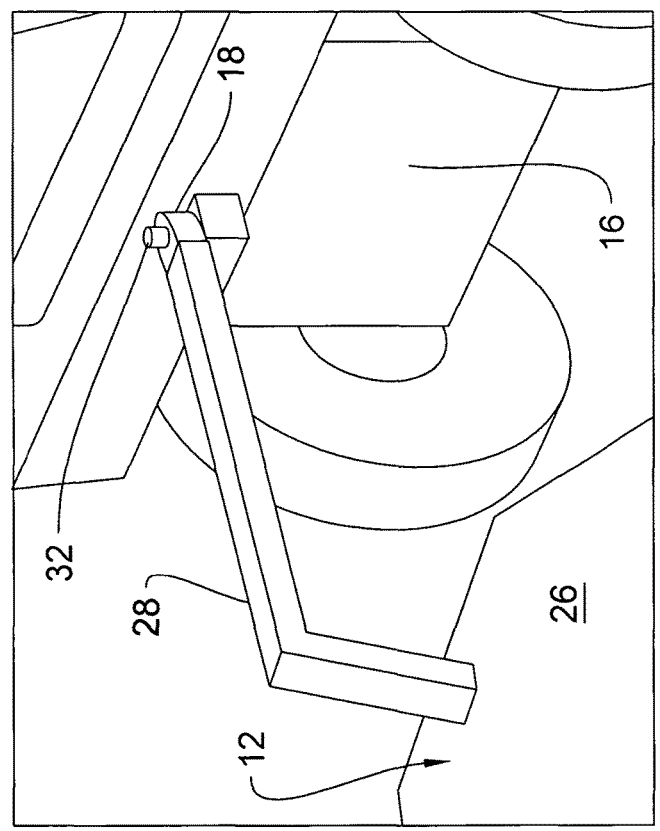
FIG. 3 is a perspective view illustrating a tow bar of the passenger trailer apparatus, constructed in accordance with the present invention, connected to a hitch mounted on the mobility scooter.

The present invention, hereinafter referred to as a Passenger Trailer Apparatus, indicated generally at 10, is a wheeled trailer 12 equipped with a comfortable seat assembly 14 and constructed to be towed behind a mobility scooter 16. Sparing mobility challenged couples the expense of acquiring, maintaining, and storing two separate mobility scooters 16, the Passenger Trailer Apparatus 10 provides secure, reliable performance, quick assembly and breakdown, and easy transport and storage. The Passenger Trailer Apparatus 10 is an accessory that fits a wide variety of mobility scooters 16 and specifically any mobility scooter 16 that is equipped with an accessory towing bar or hitch 18.

The trailer of the Passenger Trailer Assembly 10 of the present invention includes a trailer frame 20. The trailer frame 20 is a rigid structure preferably constructed from approximately one (1") inch square steel or aluminum tubing providing a solid foundation for the trailer 12. An axle 22 is mounted to and through the trailer frame 20 with a tire 24 rotatably, releasably mounted to each end of the axle 22 of the trailer frame 20 allowing the trailer 12 to easily move about. The axle 22 is preferably approximately twenty four and one half (24½) inches in length and is preferably set at a point approximately nine (9") inches forward from a rear edge of the trailer frame 20 of the trailer 12. In a preferred embodiment, each of the wheels 24 is approximately thirteen (13") inch pneumatic tires and are secured to the axle 22 by removable retaining pins or the like.

The trailer 12 of the Passenger Trailer Apparatus 10 of the present invention further includes a platform 26 having a top surface, a bottom surface opposite the top surface, a front edge, a rear edge substantially opposite the front edge, a first side edge between the front edge and the rear edge, and a second side edge substantially opposite the first side edge. The bottom surface of the platform 26 is mounted to the trailer frame 20. Preferably, the front edge, the rear edge, the first side edge, and the second side edge of the platform 26 extend beyond the outer extent of the trailer frame 20 to better protect the trailer frame 20 from damage during use. Also, it is preferable that the wheels 24 extend beyond the first side edge and the second side edge of the platform 26 and at least a portion of the wheels 24 extend above the top surface of the platform 26 allowing the platform 26 to achieve greater stability and keep the platform 26 as low as possible to the ground for easier access for passengers, as will be described in further detail below.

Preferably, the top surface of the platform 26 of the trailer 12 of the Passenger Trailer Apparatus 10 of the present invention is substantially planar and covered in carpet or other comfortable material. In a preferred embodiment, the platform 26 is constructed from a wood material including, but not limited to plywood, although constructing the platform 26 from a different material including metal, plastic, etc., is within the scope of the present invention.

The platform 26 of the trailer 12 of the Passenger Trailer Apparatus 10 of the present invention is preferably approximately sixteen (16") inches in width by thirty (30") inches in length. The first side edge and the rear edge of the platform 26 are preferably perpendicular meeting at right angles and the second side edge and the rear edge of the platform 26 are also preferably perpendicular meeting at right angles. The front edge of the platform 26 preferably angles away from the first side edge and the second side edge forming a point to center on a tongue or receiver bar 28 of the trailer 12 which rises at a diagonal from the platform 26 or the underlying trailer frame 20, which will be described in further detail below. The angled front edge of the platform 26 allows better access to the hitch area 18 of the mobility scooter 16 and allows tighter turns of the mobility scooter 16 and the trailer 12 without interference between the mobility scooter 16 and the trailer 12.

In addition, the Passenger Trailer Apparatus 10 of the present invention includes a chair assembly 14 mounted to the top surface of the platform 26 for receiving a passenger. The chair assembly 14 includes a cylindrical post 28 having a first end and a second end with the first end secured to a socket secured the top surface of the platform 26 or directly to the top surface of the platform 26 between the axle and the rear edge of the platform 26. The chair assembly 14 further includes a padded chair 30 mounted to the second end of the cylindrical post 28. The padded chair 30 is preferably comfortably padded and equipped with armrests. Also, it is preferable that no part of the chair assembly 14 extends beyond the edges of the platform 26 to the safety of the passenger and insure the best stability of the trailer 12 while towing a passenger.

Furthermore, the trailer 12 of the Passenger Trailer Apparatus 10 of the present invention includes a receiver bar 28 pivotally connected to and extending at an angle from adjacent the front edge of the platform 26. After approximately four (4") inches, the receiver bar 28 angles again to become substantially parallel to the top surface of the platform 28. At the end of the receiver bar 28, the receiver bar 28 is equipped with a swiveling, pin 32, together with an approximately four inch male extension which connects into the female fitting of the towing scooter's tow bar 18 and is releasably locked in place with the retaining pin 32. The pivoting hitch assembly makes the trailer 12 easily maneuverable behind the towing mobility scooter 16.

Since the wheels 24 and seat assembly 14 of the Passenger Trailer Apparatus 10 of the present invention are secured with substantial retaining pins, assembly and disassembly of the Passenger Trailer Apparatus 10 for storage or vehicular transport for use takes little time, i.e., only a few minutes. The Passenger Trailer Apparatus 10 contains plenty of unrestricted foot room for a seated passenger.

The Passenger Trailer Apparatus 10 of the present invention is a two-wheeled trailer 12 that assembles quickly and easily without tools, has a comfortable chair assembly 14 for a passenger, and compacts easily for transport or storage. The Passenger Trailer Apparatus 10 is a highly effective mobility solution for couples, giving them the functionality and opportunity to go places and do things together with one mobility scooter 16. Using the Passenger Trailer Apparatus 10 of the present invention eliminates the expense, maintenance, and need to accommodate two separate mobility scooters 16. Durably constructed with high quality materials and components, the Passenger Trailer Apparatus 10 will withstand many years of continued use.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A passenger trailer apparatus for towing a passenger behind a mobility scooter, the mobility scooter having a tow bar or hitch, the passenger trailer apparatus comprising:
   a trailer frame;
   an axle mounted to and through the trailer frame;
   a tire rotatably, releasably mounted to each end of the axle;
   the platform having a top surface, a bottom surface, a front edge, a rear edge, a first side edge, and a second side edge, the bottom surface of the platform mounted to the trailer frame;
   a chair assembly mounted to the top surface of the platform, the chair assembly sized and shaped for receiving a passenger; and
   a receiver bar having a first end and a second end, the first end of the receiver bar connected to the platform, the second end of the receiver bar capable of being releasably connected to the tow bar or hitch of the mobility scooter;
   wherein the receiver bar extends from the platform at an angle, adjacent the front edge of the platform; and
   wherein at a predetermined point distant from the platform, the receiver bar angles to be substantially parallel to the top surface of the platform; and
   wherein the second end of the receiver bar has a swiveling pin for releasably connecting the receiver bar to the mobility scooter.

2. The passenger trailer assembly of claim 1 wherein the trailer frame is a rigid structure constructed from approximately square steel or aluminum tubing.

3. The passenger trailer assembly of claim 1 wherein the axle is positioned between an approximate center of the platform and the rear edge of the platform.

4. The passenger trailer assembly of claim 1 wherein each of the wheels is secured to the axle by removable retaining pins.

5. The passenger trailer assembly of claim 1 wherein the front edge, the rear edge, the first side edge, and the second side edge of the platform extend beyond an outer extent of the trailer frame.

6. The passenger trailer assembly of claim 1 wherein the wheels extend beyond the first side edge and the second side edge of the platform.

7. The passenger trailer assembly of claim 1 wherein at least a portion of the wheels extend above the top surface of the platform.

8. The passenger trailer assembly of claim 1 wherein the first side edge and the rear edge of the platform are perpendicular meeting at right angles and the second side edge and the rear edge of the platform are perpendicular meeting at right angles, wherein the front edge of the platform preferably angles away from the first side edge and the second side edge forming a point.

9. The passenger trailer assembly of claim 1 wherein the chair assembly includes a post having a first end and a second end with the first end secured to the top surface of the platform and a padded chair mounted to the second end of the post.

10. The passenger trailer assembly of claim 9 wherein the post is secured to the top surface of the platform between the axle and the rear edge of the platform.

11. The passenger trailer assembly of claim 1 wherein the chair assembly is free from extending beyond the rear edge of the platform.

12. A method for towing a passenger behind a mobility scooter, the mobility scooter having a tow bar or hitch, the method comprising: providing a trailer frame; mounting an axle mounted to and through the trailer frame; rotatably, releasably mounting a tire to each end of the axle; positioning a platform having a top surface and a bottom surface upon the trailer frame; mounting a chair assembly to the top surface of the platform; sizing and shaping the chair assembly for receiving a passenger; providing a receiver bar having a first end and a second end; connecting the first end of the receiver bar to the platform; releasably swivel pinning the second end of the receiver bar to the tow bar or hitch of the mobility scooter.

13. A passenger trailer apparatus for towing a passenger behind a mobility scooter, the mobility scooter having a tow bar or hitch, the passenger trailer apparatus comprising:
   a trailer frame having an outer extent;
   an axle mounted to and through the trailer frame;
   a tire rotatably, releasably mounted to each end of the axle;
   the platform having a top surface, a bottom surface, a front edge, a rear edge, a first side edge, and a second side edge, the bottom surface of the platform mounted to the trailer frame, an outer extent of the platform extending completely beyond the outer extent of the trailer frame;
   a chair assembly mounted to the top surface of the platform, the chair assembly sized and shaped for receiving a passenger; and
   a receiver bar having a first end and a second end, the first end of the receiver bar connected to the platform, the second end of the receiver bar capable of being releasably connected by a swiveling pin to the tow bar or hitch of the mobility scooter;
   wherein the front edge of the platform preferably angles away from the first side edge and the second side edge forming a point.

14. The passenger trailer assembly of claim 13 wherein the axle is positioned between an approximate center of the platform and the rear edge of the platform.

15. The passenger trailer assembly of claim 13 wherein the wheels extend beyond the first side edge and the second side edge of the platform.

16. The passenger trailer assembly of claim 13 wherein at least a portion of the wheels extend above the top surface of the platform.

17. The passenger trailer assembly of claim 13 wherein the receiver bar extends from the platform at an angle, adjacent the front edge of the platform, wherein at a predetermined point distant from the platform, the receiver bar angles to be substantially parallel to the top surface of the platform.

\* \* \* \* \*